United States Patent Office 3,385,669
Patented May 28, 1968

3,385,669
METHOD OF PREPARING ZIRCONIUM CARBIDE FIBERS AND THE PRODUCT THEREOF
Robert A. Clifton, Jr., Knoxville, and Robert C. Johnson, Norris, Tenn., assignors to the United States of America as represented by the Secretary of the Interior
No Drawing. Filed Apr. 21, 1965, Ser. No. 449,898
4 Claims. (Cl. 23—208)

ABSTRACT OF THE DISCLOSURE

Zirconium carbide fibers are produced by reacting zirconium oxide fibers with carbon.

---

The invention herein described and claimed may be manufactured and used by or for the Government of the United States of America for governmental purposes without the payment of royalties thereon or therefor.

This invention relates to preparation of inorganic refractory carbides, particularly zirconium carbide, in fibrous form. Such fibers are useful for any application where high temperature refractory fibers are needed, in nonoxidizing atmospheres. Examples are reinforcement for high temperature composites, loose fill thermal insulation and felted insulation.

Copending application Ser. No. 438,130 discloses preparation of fibers of inorganic refractory materials such as zirconia. It has now been found that the fibers prepared by the method of this copending application can be converted to the corresponding carbide, in fibrous form, by treatment of the oxide fiber with carbon at elevated temperature.

Conversion of the oxide to carbide involves reduction and diffusion at the elevated temperature. Lampblack has been found to be very effective in the process and is employed in the example below; however, other carbon materials such as graphite or coke fines may be used. The oxide fiber is intimately contacted with the carbon as by embedding in the latter and the mixture is then fired at a suitable temperature for a time sufficient to convert the oxide to carbide.

Optimum temperature and time of firing may vary considerably depending on the type and size of the inorganic fiber and are best determined experimentally. In general, however, temperatures may range from about 800° C. to about 1600° C. to 1800° C. with reaction time being from about 15 minutes to several hours. Optimum amounts of carbon are also not critical and are readily determined experimentally; however, it is generally necessary to provide an excess of carbon for embedding the oxide fiber.

The reaction is carried out under vacuum or inert gas atmosphere to prevent oxidation of the carbide product at the elevated temperature. An inert atmosphere is generally preferable for continuous production of the carbide fibers. Gaseous CO is also formed as a product of the reaction and may be removed by any suitable means.

The products of the invention are refractory fibers of considerably higher melting point than the parent oxide fibers (e.g., 3175° C.±50 for ZrC fibers as compared to 2700° C. for $ZrO_2$ fibers). They have crystal forms stable at all usable temperatures and low thermal coefficients of linear expansion (e.g., $6.73 \times 10^{-6}$ percent/degree for ZrC fibers). The products also have a very low thermal conductivity rating (0.049 cal./cm. sec. at 100° C. for ZrC). In addition, fibers of any length and with controllable diameter may be prepared by using oxide fibers of similar dimensions as starting material.

Carbides have previously been manufactured from oxides by treatment with carbon as disclosed, e.g., in U.S. Patent 3,161,470. However, preparation of polycrystalline carbide fibers having the advantageous properties discussed above has not been previously known.

The invention will be more specifically illustrated by the following specific example.

Example

Batch.—$ZrO_2$ fibers.
Procedure.—A small portion of the $ZrO_2$ fibers were embedded in lampblack in a graphite crucible and the cruicible put into an Ajax induction furnace. The furnace was evacuated to $<100$ microns and a slow initial temperature rise begun. The temperature was raised to 1700° C. and held there for 15 minutes, after which the furnace was cooled and the sample removed.

Results.—Upon removal from the crucible all of the fibers had a lustrous grey color. X-ray diffraction showed greater than 95 percent cubic ZrC and no detectable amounts of $ZrO_2$. The fibers were essentially unchanged physically (i.e., a pseudomorph), but were nearly completely altered chemically from $ZrO_2$ to ZrC.

Although the invention has been specifically described with reference to the preparation of ZrC fibers, it may also be used to prepare fibers of other refractory carbides, such as Ti, Hf, V, Nb, Ta, Mo, and W caribdes by treatment of the corresponding oxide fiber with carbon at elevated temperatures.

What is claimed is:
1. A method for preparation of fibers of zirconium carbide comprising reacting fibers of zirconium oxide with carbon in an inert environment at an elevated temperature of about 1700° C.
2. A polycrystalline zirconium carbide fiber produced by the process of claim 1.
3. Method of claim 1 in which the reaction is carried out at said temperature of about 1700° C. for about 15 minutes.
4. Method of claim 3 in which the carbon is lampblack.

References Cited

UNITED STATES PATENTS

| | | | |
|---|---|---|---|
| 2,800,393 | 7/1957 | Mettler | 23—208 |
| 3,088,805 | 5/1963 | Cotter et al. | 23—208 X |

FOREIGN PATENTS 676,321  12/1963  Canada.

OTHER REFERENCES

Schwarzkopf et al., Refractory Hard Metals, The MacMillan Co., 1953, pp. 89–91. TN 677 S 36.

Burgers et al., Zeitschrift fur Anorganische und Allgemeine Chemie, 216, January 1964, pp. 217, 218 and 222. QD 1 Z 4.

OSCAR R. VERTIZ, *Primary Examiner.*

MILTON WEISSMAN, *Examiner.*

G. T. OZAKI, *Assistant Examiner.*